US012683698B2

(12) United States Patent
Liu et al.

(10) Patent No.: US 12,683,698 B2
(45) Date of Patent: Jul. 14, 2026

(54) AIR-TO-GROUND DEDICATED RANDOM ACCESS CHANNEL CONFIGURATION DESIGN FOR WIRELESS AIR-TO-GROUND COMMUNICATIONS

(71) Applicant: QUALCOMM Incorporated, San Diego, CA (US)

(72) Inventors: Kangqi Liu, San Diego, CA (US); Qiaoyu Li, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 18/553,353

(22) PCT Filed: Jun. 9, 2021

(86) PCT No.: PCT/CN2021/099080
§ 371 (c)(1),
(2) Date: Sep. 29, 2023

(87) PCT Pub. No.: WO2022/257037
PCT Pub. Date: Dec. 15, 2022

(65) Prior Publication Data
US 2024/0179756 A1      May 30, 2024

(51) Int. Cl.
*H04B 17/318*      (2015.01)
*H04W 56/00*      (2009.01)
(Continued)

(52) U.S. Cl.
CPC ...... *H04B 17/328* (2023.05); *H04W 56/0015* (2013.01); *H04W 74/0838* (2024.01); *H04W 74/0836* (2024.01); *H04W 84/06* (2013.01)

(58) Field of Classification Search
CPC ............ H04B 17/328; H04W 56/0015; H04W 74/0838; H04W 74/0836; H04W 84/06; H04W 74/006
See application file for complete search history.

(56) References Cited

U.S. PATENT DOCUMENTS

2020/0296644 A1    9/2020   Logothetis et al.
2020/0296649 A1    9/2020   Dudzinski et al.
(Continued)

FOREIGN PATENT DOCUMENTS

CN      111556480 A      8/2020
CN      112449439 A   *   3/2021    ........ H04W 74/0833
CN      113271167 A      8/2021

OTHER PUBLICATIONS

International Search Report and Written Opinion—PCT/CN2021/099080—ISA/EPO—Mar. 1, 2022.
(Continued)

*Primary Examiner* — Liem H. Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication of an air-to-ground (ATG) dedicated random access channel (RACH) configuration. The UE may communicate with the base station based at least in part on the ATG dedicated RACH configuration. Numerous other aspects are described.

25 Claims, 11 Drawing Sheets

600 ⟶

(51) Int. Cl.

| | | |
|---|---|---|
| *H04W 74/0836* | (2024.01) | |
| *H04W 74/0838* | (2024.01) | |
| *H04W 84/06* | (2009.01) | |

(56) References Cited

U.S. PATENT DOCUMENTS

| | | | |
|---|---|---|---|
| 2020/0296710 A1 | 9/2020 | Logothetis et al. | |
| 2020/0296774 A1 | 9/2020 | Logothetis et al. | |
| 2021/0251012 A1* | 8/2021 | Shrestha ............... | H04W 72/23 |
| 2022/0278803 A1* | 9/2022 | Cao ....................... | H04L 5/0051 |
| 2022/0393957 A1* | 12/2022 | Wang ................. | H04B 7/18513 |
| 2023/0268983 A1* | 8/2023 | Shao ........................ | H04B 1/10 |
| | | | 370/316 |

OTHER PUBLICATIONS

Mediatek Inc., "Summary of 8.4.4 Other Aspects of NR-NTN", 3GPP TSG RAN WG1 Meeting #102e, R1-2007002, Aug. 28, 2020 (Aug. 28, 2020), 24 Pages, The Whole Document.

* cited by examiner

600

605
SIB/MIB: base station is ATG base station

610
Indication: ATG dedicated RACH configuration

615
RAM (based at least in part on ATG dedicated RACH configuration)

ATG Base Station 310

ATG UE 305

Receive, from a base station, an indication of an air-to-ground (ATG) dedicated random access channel (RACH) configuration

710

Communicate with the base station based at least in part on the ATG dedicated RACH configuration

720

700

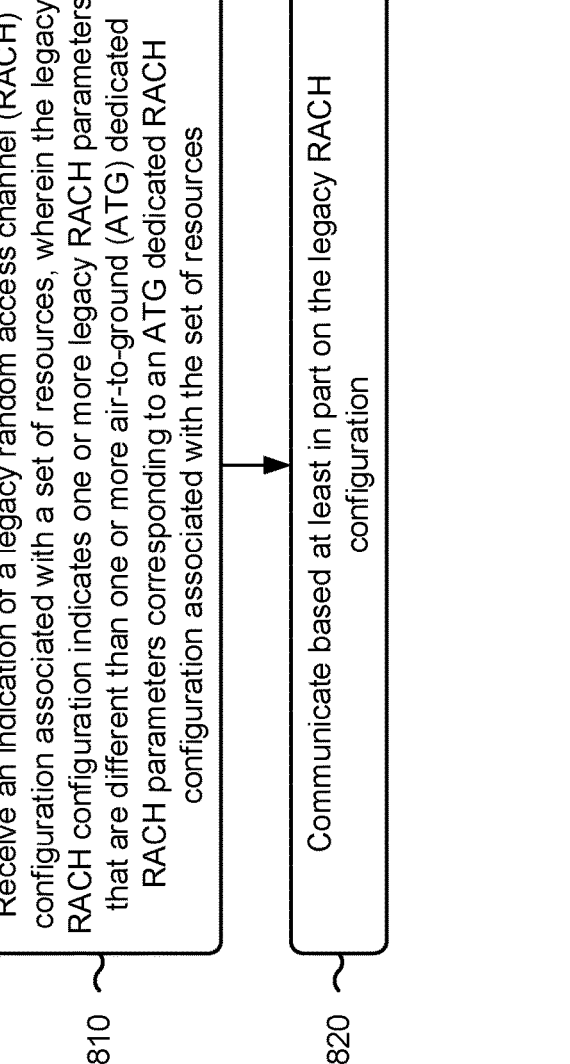

800

810    Receive an indication of a legacy random access channel (RACH) configuration associated with a set of resources, wherein the legacy RACH configuration indicates one or more legacy RACH parameters that are different than one or more air-to-ground (ATG) dedicated RACH parameters corresponding to an ATG dedicated RACH configuration associated with the set of resources 820    Communicate based at least in part on the legacy RACH configuration

FIG. 8

Transmit, to a user equipment (UE), an indication of an air-to-ground (ATG) dedicated random access channel (RACH) configuration

910

Communicate with the UE based at least in part on the ATG dedicated RACH configuration

920

900

AIR-TO-GROUND DEDICATED RANDOM ACCESS CHANNEL CONFIGURATION DESIGN FOR WIRELESS AIR-TO-GROUND COMMUNICATIONS

CROSS-REFERENCE TO RELATED APPLICATION

This Patent Application is a 371 national stage of PCT Application No. PCT/CN2021/099080 filed on Jun. 9, 2021, entitled "AIR-TO-GROUND DEDICATED RANDOM ACCESS CHANNEL CONFIGURATION DESIGN FOR WIRELESS AIR-TO-GROUND COMMUNICATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for air-to-ground dedicated random access channel configuration design for wireless air-to-ground communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors, coupled to the memory, configured to: receive, from a base station, an indication of an air-to-ground (ATG) dedicated random access channel (RACH) configuration; and communicate with the base station based at least in part on the ATG dedicated RACH configuration.

In some aspects, a UE for wireless communication includes a memory and one or more processors, coupled to the memory, configured to: receive an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources; and communicate based at least in part on the legacy RACH configuration.

In some aspects, a base station for wireless communication includes a memory; and one or more processors, coupled to the memory, configured to: transmit, to a UE, an indication of an ATG dedicated RACH configuration; and communicate with the UE based at least in part on the ATG dedicated RACH configuration.

In some aspects, a method of wireless communication performed by a UE includes receiving, from a base station, an indication of an ATG dedicated RACH configuration; and communicating with the base station based at least in part on the ATG dedicated RACH configuration.

In some aspects, a method of wireless communication performed by a UE includes receiving an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources; and communicating based at least in part on the legacy RACH configuration.

In some aspects, a method of wireless communication performed by a base station includes transmitting, to a UE, an indication of an ATG dedicated RACH configuration; and communicating with the UE based at least in part on the ATG dedicated RACH configuration.

In some aspects, a non-transitory computer-readable medium storing a set of instructions for wireless communication includes one or more instructions that, when executed by one or more processors of a UE, cause the UE to: receive, from a base station, an indication of ATG dedicated RACH configuration; and communicate with the base station based at least in part on the ATG dedicated RACH configuration.

In some aspects, a non-transitory computer-readable medium storing a set of instructions for wireless communication includes one or more instructions that, when executed by one or more processors of an UE, cause the UE to: receive an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources; and communicate based at least in part on the legacy RACH configuration.

In some aspects, a non-transitory computer-readable medium storing a set of instructions for wireless communication includes one or more instructions that, when executed by one or more processors of a base station, cause the base station to: transmit, to a UE, an indication of an ATG dedicated RACH configuration; and communicate with the UE based at least in part on the ATG dedicated RACH configuration.

In some aspects, an apparatus for wireless communication includes means for receiving, from a base station, an indication of an ATG dedicated RACH configuration; and means for communicating with the base station based at least in part on the ATG dedicated RACH configuration.

In some aspects, an apparatus for wireless communication includes means for receiving an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources; and means for communicating based at least in part on the legacy RACH configuration.

In some aspects, an apparatus for wireless communication includes means for transmitting, to a UE, an indication of an ATG dedicated RACH configuration; and means for communicating with the UE based at least in part on the ATG dedicated RACH configuration.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-9 are diagrams illustrating example processes associated with ATG dedicated RACH configuration, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
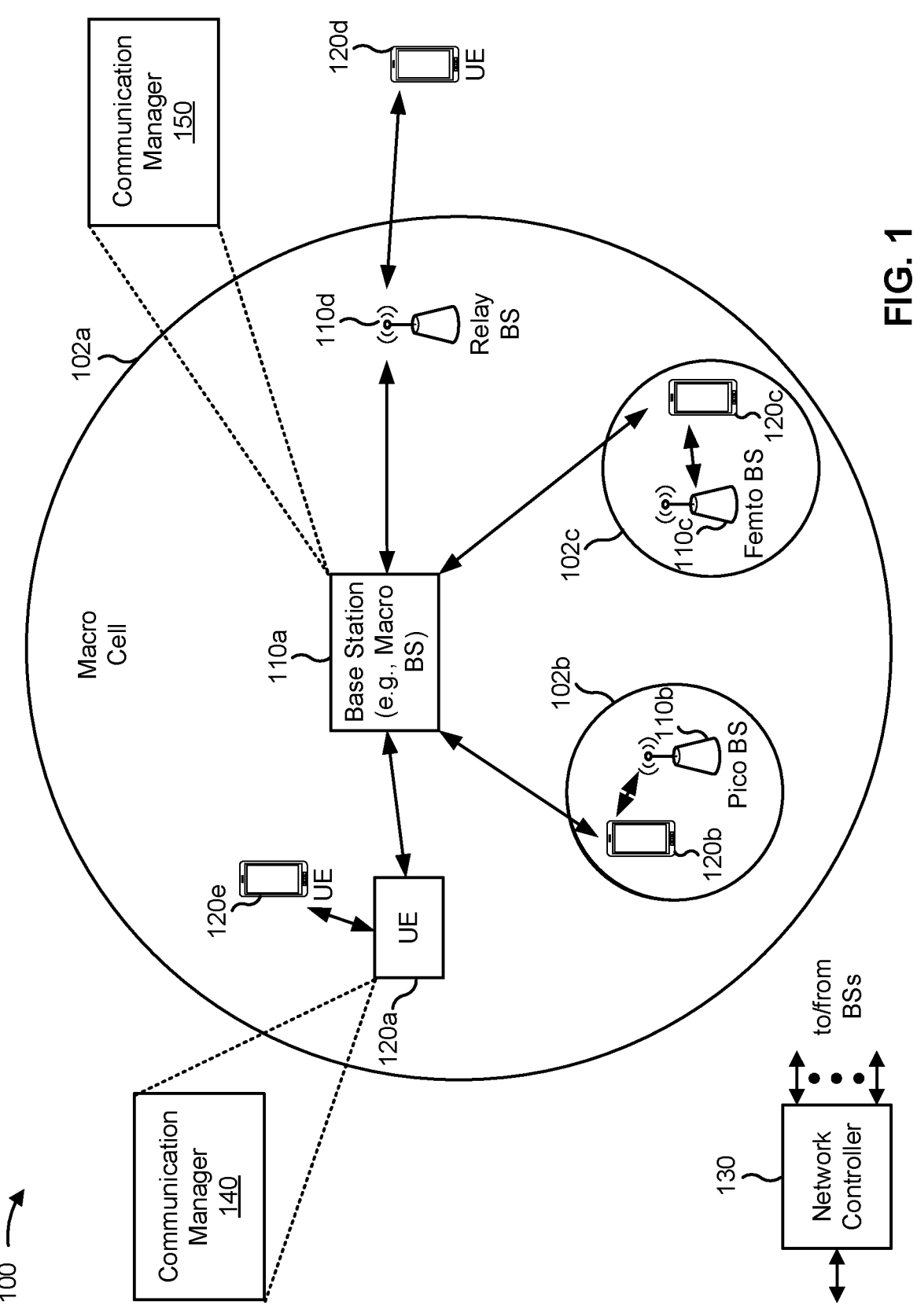
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a BS may be associated with an ATG network such as an ATG radio access network (RAN). ATG networks involve communication between a UE and a base station, where at least one of the UE or the base station is airborne or in orbit. An example of an ATG network is described in connection with FIG. 3, below.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be associated with an ATG network. For example, a UE may be associated with an aircraft (referred to herein as an aircraft UE). An example of an ATG RAN involving a set of UEs and an aircraft UE is described in connection with FIG. 3.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled. Some UEs may be considered aircraft UEs, which may provide connectivity to a RAN for an aircraft.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from a base station, an indication of an ATG dedicated random access channel (RACH) configuration; and communicate with the base station based at least in part on the ATG dedicated RACH configuration. Additionally, or alternatively, the communication manager 140 may perform one or more other operations described herein.

In some aspects, the UE 120 may include a communication manager 140. As described in more detail elsewhere herein, the communication manager 140 may receive an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources; and communicate based at least in part on the legacy RACH configuration. Additionally, or alternatively, the communication manager 140 may perform one or more other operations described herein.

In some aspects, the base station 110 may include a communication manager 150. As described in more detail elsewhere herein, the communication manager 150 may transmit, to a UE, an indication of an ATG dedicated RACH configuration; and communicate with the UE based at least in part on the ATG dedicated RACH configuration. Additionally, or alternatively, the communication manager 150 may perform one or more other operations described herein.

As indicated above, FIG. 1 is provided as an example. Other examples may differ from what is described with regard to FIG. 1.

Figure 2:
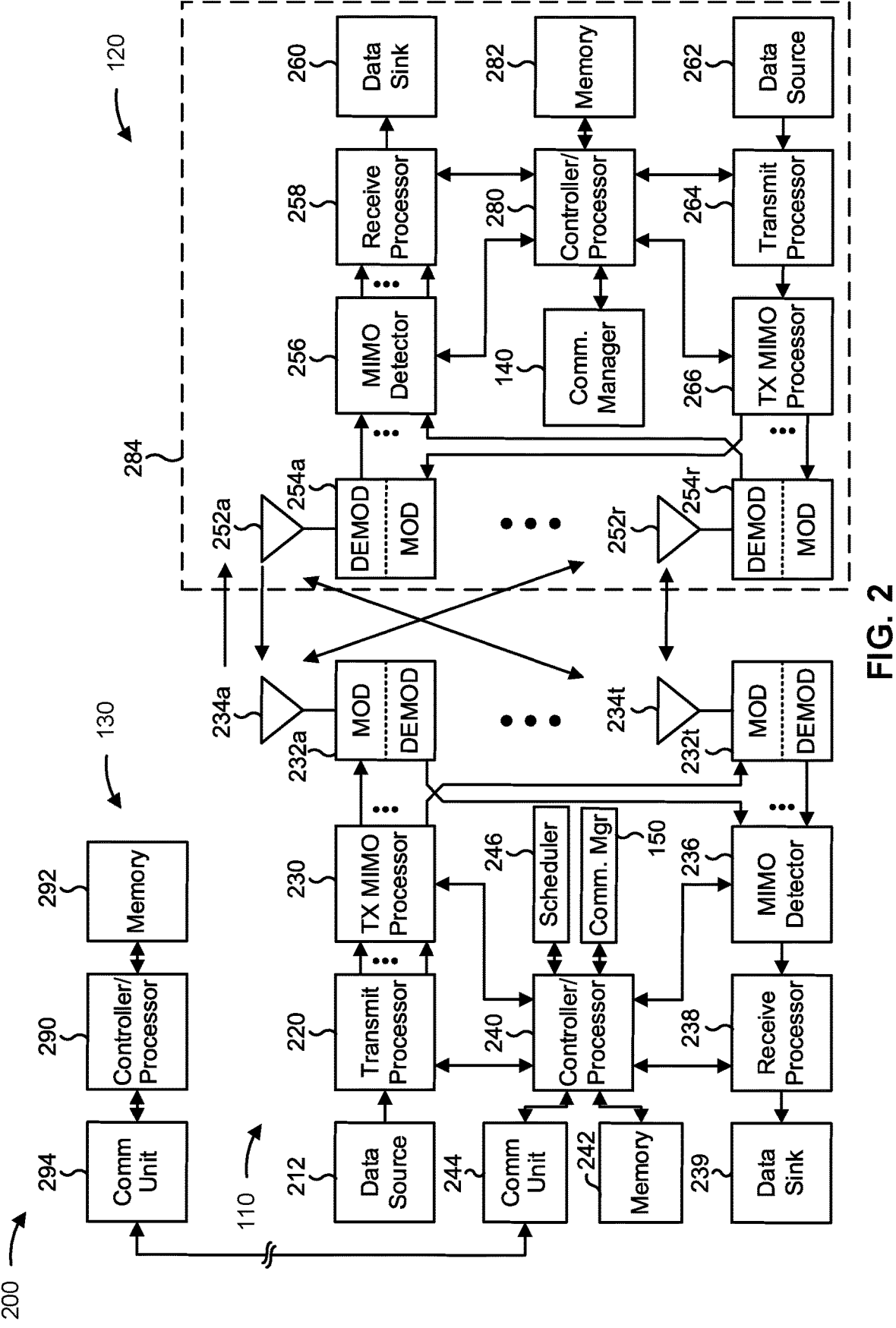
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-9.

Controller/processor 240 of base station 110, controller/processor 280 of UE 120, and/or any other component(s) of FIG. 2 may perform one or more techniques associated with ATG dedicated RACH configuration design for wireless ATG communications, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for receiving, from a base station, an indication of an ATG dedicated RACH configuration; and/or means for communicating with the base station based at least in part on the ATG dedicated RACH configuration. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the UE includes means for receiving an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources; and/or means for communicating based at least in part on the legacy RACH configuration. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE, an indication of an ATG dedicated RACH configuration; and/or means for communicating with the UE based at least in part on the ATG dedicated RACH configuration. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
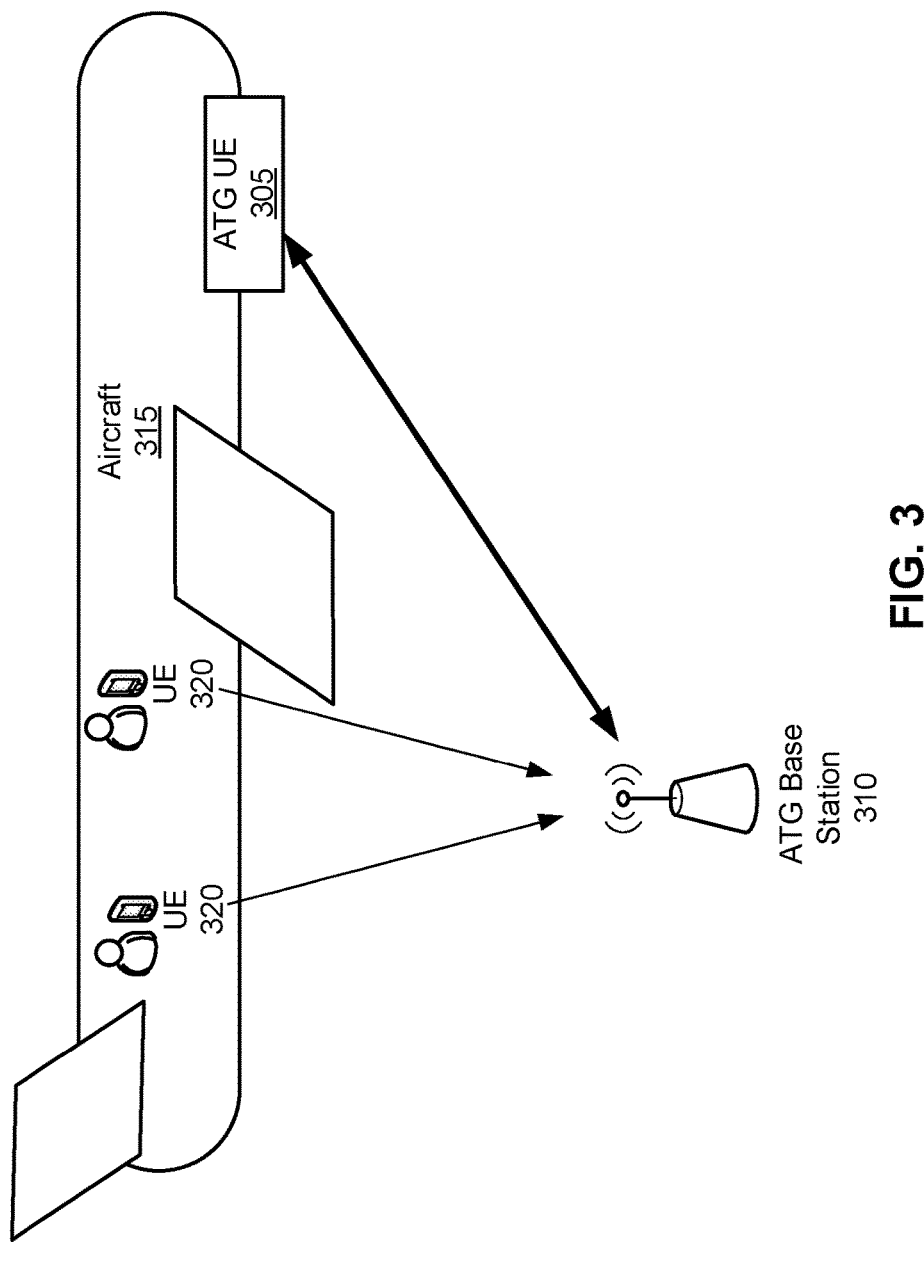
FIG. 3 is a diagram illustrating an example of an air-to-ground (ATG) network, in accordance with the present disclosure.

FIG. 3 is a diagram illustrating an example 300 of an ATG network, in accordance with the present disclosure. An ATG network may facilitate ATG communications between a base station (e.g., BS 110) and a UE (e.g., UE 120). ATG communications are communications between a base station and a UE where at least one of the UE or the base station is airborne or in orbit. In one example, an ATG network may facilitate communication between a base station located on the ground (such as with up-tilted antennas) and a UE affixed to an airborne aircraft (such as with an antenna at the bottom of the aircraft). This may be particularly useful in inland or coastal regions, as compared to a sea or ocean where base stations may be more sparsely distributed. Generally, ATG communications may provide connectivity at a lower cost and with higher throughput and lower latency than satellite communication based access networks. It should be noted that "ATG" does not imply that communications necessarily flow from an airborne device to a device on the ground. Communications via an ATG link can flow from air to ground or from ground to air.

Example 300 includes an ATG UE 305 (e.g., UE 120) and an ATG base station 310 (e.g., base station 110). In some aspects, ATG UE 305 may be referred to as an aircraft UE. ATG UE 305 may provide mobile-terminated communication via a radio access network (RAN) accessed via ATG base station 310. For example, ATG UE 305 may facilitate air traffic management communications, aircraft surveillance communications, aircraft maintenance communications, aircraft passenger communications (such as via a small cell provided on aircraft 315), or the like. In some aspects, ATG UE 305 may have an antenna (e.g., antenna 252, such as a blade antenna), which may be mounted to aircraft 315. In some aspects, the antenna may have beamforming capabilities. In some aspects, the antenna may be associated with an advanced microwave sounding unit (AMSU).

ATG UE 305 is associated with an aircraft 315. In some examples, aircraft 315 is a passenger aircraft, though the techniques and apparatuses described herein are not limited to those involving passenger aircraft. Aircraft 315 may include any sort of aircraft, such as an airplane, a helicopter, an unmanned aerial vehicle (UAV), a lighter-than-air vehicle (e.g., a dirigible, such as a blimp or a rigid airship), a balloon, or the like.

Aircraft 315 includes one or more UEs 320 (e.g., UE 120). UE 320 may be referred to herein as a passenger UE. In some examples, UE 320 is associated with a passenger (e.g., passenger, pilot, or flight attendant) of aircraft 315. However, the techniques and apparatuses described herein are not limited to those in which UE 320 is associated with a passenger of aircraft 315. In some aspects, aircraft 315 may not include a UE 320. In some aspects, UE 320 is not an ATG UE 305. In some aspects, ATG UE 305 may be associated with a higher transmit power than UE 320. For example, ATG UE 305 may have a higher effective isotopically radiated power (EIRP), a higher transmission power, and/or a larger on-board antenna gain than UE 320. In some aspects, a large number of UEs 320 may be expected. For example, in a passenger aircraft 315, it may be expected that dozens or hundreds of UEs 320 may be present, and some subset of these UEs 320 may be active at a given time.

ATG UE 305 may be associated with a link to the ATG base station 310. The link is referred to herein as an ATG link. Communications via an ATG link can use time division duplexing (TDD) or frequency division duplexing (FDD). Generally, ATG communications may be associated with large inter-site distances (ISDs) and large coverage ranges. For example, an ATG network may be associated with ISDs of approximately 100 km to 200 km and up to 300 km in some scenarios (such as when aircraft 315 is over an area with few base stations, such as a body of water). In some cases, an ATG network may be deployed in the same frequency range or the same frequency band as a terrestrial network. In one example, an ATG network may be deployed in the range of approximately 4.5-5.0 GHz. In some examples, an ATG network may be associated with a relatively large timing adjustment (TA) relative to a terrestrial network. A TA is applied to communications between two wireless nodes to account for propagation delays between the two wireless nodes. For example, in an ATG network which can be associated with up to 300 km ISDs, a 2 ms TA may reduce the occurrence of frequent handover and inter-cell interference (though TA values are variable and may differ from network to network or situation to situation). ATG networks may be associated with large per-cell throughput. For example, for a given aircraft 315, over 1 Gbps data rate may be expected (such as 1.2 Gbps on the downlink and 600 Mbps on the uplink). Furthermore, in some scenarios, such as around high-traffic airports, many aircraft 315 may be within a single ATG cell. As just one example, in a cell of 18000 square kilometers, 60 aircraft 315 may be expected.

ATG base station 310 (e.g., BS 110) may include a terrestrial base station or a non-terrestrial base station. In some aspects, ATG base station 310 may be an NR-ATG specific base station. ATG base station 310 may provide a cell that covers aircraft 315.

As indicated above, FIG. 3 is provided as an example. Other examples may differ from what is described with regard to FIG. 3.

Figure 4:
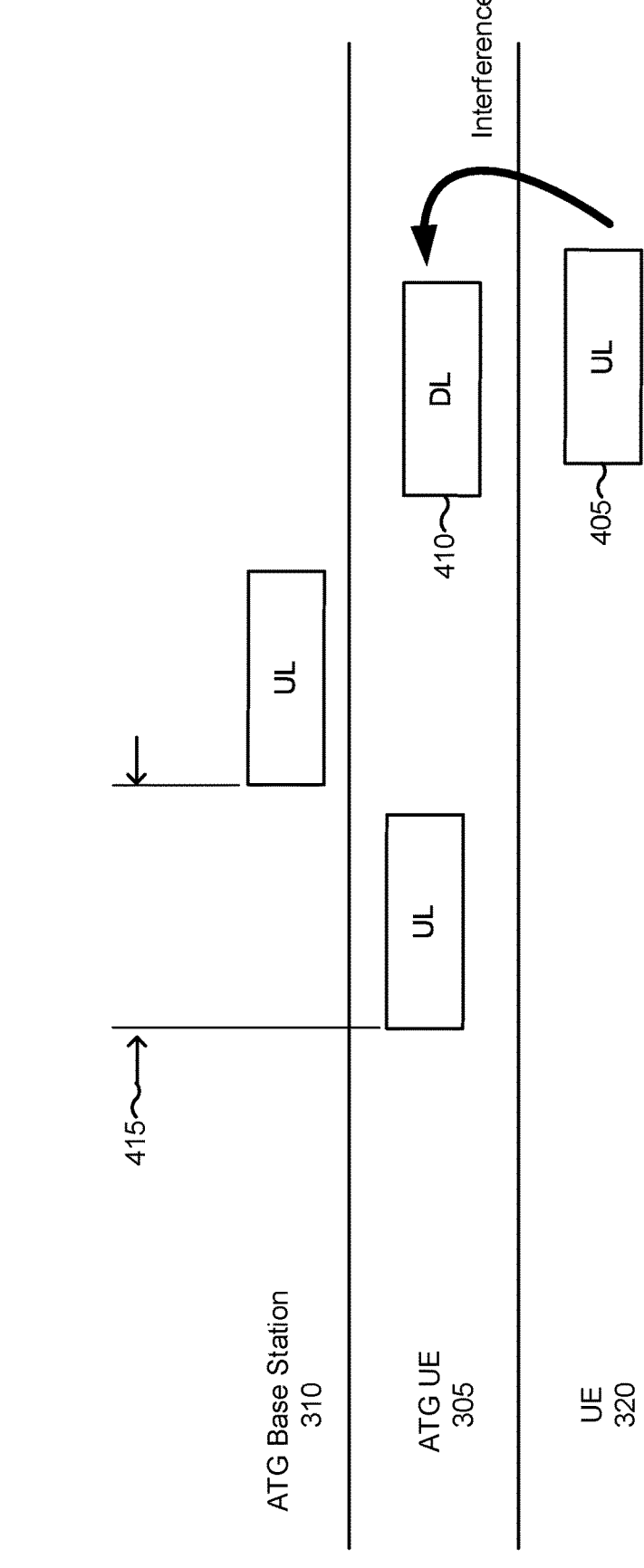
FIG. 4 is a diagram illustrating an example of interference between a UE and an ATG UE, in accordance with the present disclosure.

FIG. 4 is a diagram illustrating an example 400 of interference between a UE 320 and an ATG UE 305, in accordance with the present disclosure. As shown, example 400 includes an ATG base station 310, an ATG UE 305, and a UE 320.

ATG UE 305's communications with ATG base station 310 may be associated with a receiving signal to interference plus noise (SINR) ratio. As one example, reception at ATG UE 305 may be associated with an SINR of approximately 20 dB. At this high SINR, it may be expected that passenger UEs 320 within aircraft 315 (not shown in FIG. 3) can also receive transmissions from ATG base station 310, even if these transmissions are intended for ATG UE 305. For example, a UE 320 may receive a synchronization signal block (SSB, defined in more detail in connection with FIG. 5) and may initiate a random access channel (RACH) procedure to connect to a cell provided by the ATG base station 310.

A RACH procedure is a procedure by which a UE can transmit a RACH message via a predefined resource, typically referred to as a physical RACH (PRACH) occasion. A PRACH occasion is configured with some number of PRACH preambles. A UE may select or be configured with a PRACH preamble, and may transmit the PRACH preamble via a first message of the RACH procedure. RACH procedures are used for various purposes. In the context described herein, RACH may be used for initial access (such as from a radio resource control (RRC) idle mode), transitioning from an inactive mode to a connected mode, RRC connection re-establishment, or handover. RACH may be used for on-demand system information (SI), beam failure recovery (BFR), time alignment for secondary cell addition, and/or synchronous reconfiguration, among other examples.

As mentioned above, the reception of an SSB decodable by an ATG UE 305 or a UE 320 may trigger the ATG UE 305 or the UE 320 to perform a RACH procedure. In example 400, the UE 320 performs an uplink transmission 405, which may be a RACH message of a RACH procedure. As further shown, the uplink transmission 405 interferes with a downlink reception 410 of the ATG UE 305. For example, a TA may be used to prevent interference between UEs covered by a base station, such as ATG UE 305 and UE 320. The ATG UE 305 may have an accurate TA value 415 (shown as a difference between the ATG UE UL slot and the ATG base station UL slot), such as determined by a global navigation satellite system (GNSS) or configured in a downlink RACH message by the ATG base station 310. However, for the purpose of transmission of the first RACH message, the UE 320 may not have a TA or may only have a TA as configured in an SSB, a master information block (MIB), or a system information block (SIB) (such as via a configured parameter ServingCellConfigCommon), which may take certain predefined values not usable in an ATG scenario. In this example, the UE 320's TA may be misaligned with the ATG UE 305's TA, such that reception by the ATG UE 305 occurs concurrently with transmission by the UE 320. This concurrent reception and transmission may cause interference with downlink reception by the ATG UE 305. Furthermore, a UE 320 may not have sufficient transmit power to enable the UE 320 to successfully transmit the RACH message to the ATG base station 310, meaning that the UE 320 may not receive a response to the RACH message. If the UE 320 does not receive a response to the RACH message, the UE 320 may repeatedly transmit the RACH message, thus causing ongoing interference at the ATG UE 305. This scenario may lead to diminished throughput, degraded radio communication performance at the ATG UE 305, and increased battery usage at the UEs 320. Furthermore, if multiple UEs 320 are triggered to perform RACH procedures concurrently, such as due to the multiple UEs 320 all receiving an SSB at the same time, RACH resources (e.g., RACH preambles, RACH occasions) may be overused by the multiple UEs 320. This may prevent or impede the ATG UE 305 from performing a RACH procedure, for example, due to unavailability of RACH resources, if the multiple UEs 320 are associated with the same RACH resources as the ATG UE 305.

Some techniques and apparatuses described herein provide an ATG dedicated RACH configuration for an ATG UE 305. For example, the ATG dedicated RACH configuration may be a dedicated RACH configuration for ATG UEs, which may use a low RO density in an existing RACH configuration. As another example, the ATG dedicated RACH configuration may configure a higher reference signal received power (RSRP) threshold for triggering a RACH procedure at a UE 320 than an existing RACH configuration, thereby throttling the rate of occurrence at which UEs 320 perform RACH procedures. In some aspects, the ATG dedicated RACH configuration may provide ROs specifically for ATG UEs (e.g., and not UEs 320). Thus, the efficiency and reliability of RACH procedures for ATG UEs is improved, and usage of RACH resources by UEs 320, particularly in association with failed RACH attempts due to a received SSB, is reduced.

As indicated above, FIG. 4 is provided as an example. Other examples may differ from what is described with regard to FIG. 4.

Figure 5:
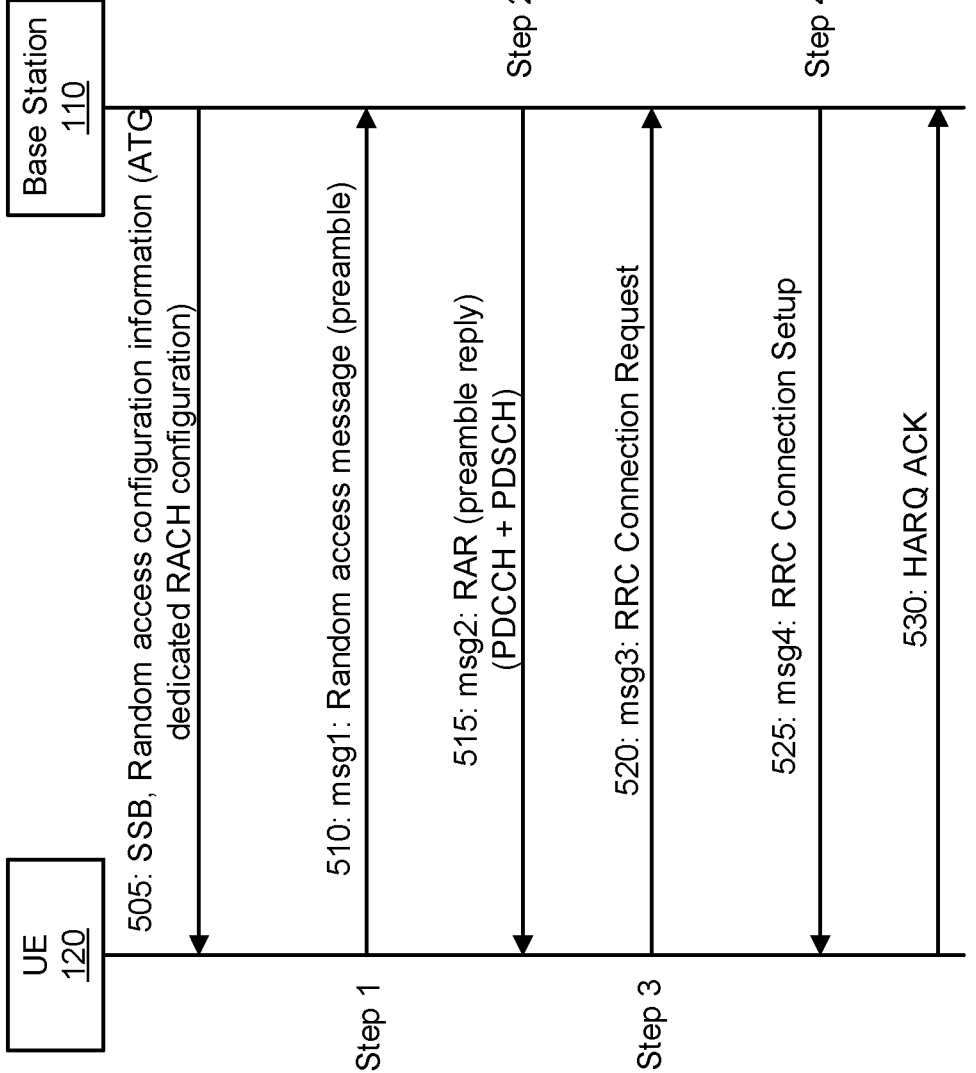
FIG. 5 is a diagram illustrating an example of a four-step random access procedure, in accordance with the present disclosure.

FIG. 5 is a diagram illustrating an example of a four-step random access procedure, in accordance with the present disclosure. As shown in FIG. 5, a base station 110 and a UE 120 (such as an ATG UE 305 or a UE 320) may communicate with one another to perform the four-step random access procedure.

As shown by reference number 505, the base station 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. In some aspects, the SSB may trigger the UE 120 to perform the random access procedure. The random access configuration information may include one or more parameters to be used in the random access procedure, such as one or more parameters for transmitting a random access message (RAM) and/or one or more parameters for receiving a random access response (RAR). In some aspects, the random access configuration information may indicate a RACH configuration for a non-ATG UE (e.g., UE 320). Additionally, or alternatively, as shown, the random access configuration information may indicate a RACH configuration for an ATG UE (e.g., ATG UE 305), as described in more detail in connection with FIG. 6.

As shown by reference number 510, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier. The preamble may be selected from a set of preambles configured by the random access configuration information. For example, the random access configuration information may configure a RACH occasion (RO) and the set of preambles may be configured as associated with the RO.

As shown by reference number 515, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 525, the base station 110 may transmit an RRC connection setup message. The RRC connection setup message may be referred to as message 5, msg4, MSG4, or a fourth message of a four-step random access procedure. In some aspects, the RRC connection setup message may include the detected UE identifier, a timing advance value, and/or contention resolution information. As shown by reference number 530, if the UE 120 successfully receives the RRC connection setup message, the UE 120 may transmit a HARQ ACK.

In some aspects, a two-step RACH procedure may be used. In a two-step RACH procedure, the first two steps of the four-step RACH procedure may be combined into a first step (also known as a "Step A") and the last two steps of the four-step RACH procedure may be combined into a second step (also known as a "Step B").

As indicated above, FIG. 5 is provided as an example. Other examples may differ from what is described with regard to FIG. 5.

Figure 6:
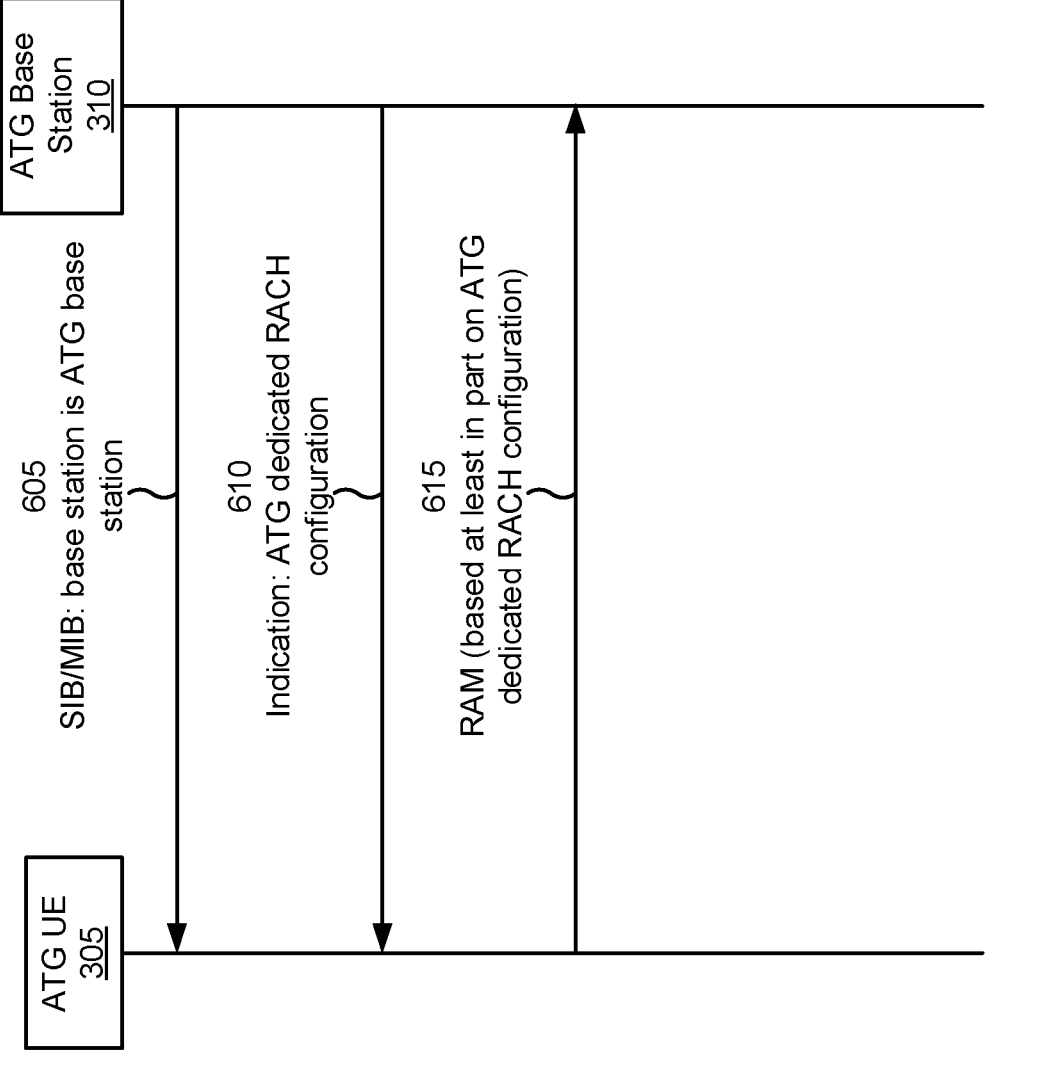
FIG. 6 is a diagram illustrating an example of signaling associated with an ATG dedicated RACH configuration, in accordance with the present disclosure.

FIG. 6 is a diagram illustrating an example 600 of signaling associated with an ATG dedicated RACH configuration, in accordance with the present disclosure. Example 600 includes an ATG UE 305 and an ATG base station 310.

As shown by reference number 605, in some aspects, the ATG base station 310 may transmit information indicating that the ATG base station 310 is an ATG base station (such as an NR-ATG specific base station). For example, the ATG base station 310 may transmit a master information block (such as in a PBCH), a system information block (SIB), or the like, including information indicating that the ATG base station 310 is an ATG base station. In some aspects, the ATG UE 320 may receive an ATG dedicated RACH configuration based at least in part on the information indicating that the ATG base station 310 is an ATG base station, as described in more detail below.

As shown by reference number 610, the ATG base station 310 may transmit, and the ATG UE 305 may receive, an ATG dedicated RACH configuration. In some aspects, the ATG base station 310 may transmit the ATG dedicated RACH configuration based at least in part on the ATG UE

305 being an ATG UE (e.g., an aircraft UE). In some aspects, the ATG base station 310 may transmit the ATG dedicated RACH configuration based at least in part on the ATG base station 310 being an ATG base station 310. In this case, the ATG UE 305 may receive the ATG dedicated RACH configuration based at least in part on the ATG base station 310 being an ATG base station (e.g., based at least in part on identifying the ATG base station 310 as an NR-ATG specific base station based at least in part on MIB or SIB indications).

In some aspects, the ATG dedicated RACH configuration may include one or more ATG dedicated RACH configuration parameters. For example, the one or more ATG dedicated RACH configuration parameters may include at least one of an ATG dedicated RACH common configuration parameter and/or an ATG dedicated RACH generic configuration parameter. In some aspects, the ATG dedicated RACH common configuration parameter may be denoted by a name such as RACH-ConfigCommonATG, and/or the ATG dedicated RACH generic configuration parameter may be denoted by a name such as RACH-ConfigGenericATG. The ATG dedicated RACH common configuration parameter may provide RACH related information (such as via SIB1 or through RRC signaling).

In some aspects, the ATG dedicated RACH common configuration and/or the ATG dedicated RACH generic configuration may indicate a PRACH format to use, when to send a RACH message in the time domain, the number of RACH occasions available, the number of RACH occasions multiplexed in one time instance, a frequency offset of a lowest RACH occasion in the frequency domain with respect to PRB 0, a maximum number of preamble transmissions performed before declaring a failure, a power ramping step, a response window length, a number of preambles available per RACH occasion, a contention resolution timer value, a subcarrier spacing of the RACH message, a number of SSBs mapped per RACH occasion, and/or a number of contention based preambles available per SSB, among other examples. One or more of the above indicated parameters may be dedicated for ATG UEs. For example, the ATG dedicated RACH common configuration parameter and/or the ATG RACH generic configuration parameter may indicate one or more ATG dedicated RACH occasions. The one or more ATG dedicated RACH occasions may include a set of ROs specific to (e.g., dedicated to) RACH procedures for ATG UEs. An ATG dedicated RACH occasion is a RACH occasion that is configured for ATG UEs (e.g., ATG UE 305) and not for non-ATG UEs (e.g., UE 320).

In some aspects, the ATG dedicated RACH configuration may be provided by a RACH parameter, such as a RACH common configuration parameter (e.g., RACH-ConfigCommon), a RACH generic configuration parameter (e.g., RACH-ConfigGeneric), or a RACH two-step random access parameter (e.g., RACH-ConfigCommonTwoStepRA). In some aspects, the RACH parameter may indicate a density of ATG dedicated RACH occasions within a set of resources that is greater than a density of legacy RACH occasions within the set of resources. Additionally, or alternatively, the RACH parameter may indicate a quantity of SSBs per ATG dedicated RACH occasion that is less than a quantity of SSBs per legacy RACH occasion. For example, an ssb-perRACH-OccasionAndCB-PreamblesPerSSB parameter of the RACH parameter may indicate a quantity of SSBs per RACH occasion. Additionally, or alternatively, the RACH parameter may indicate a quantity of preambles per ATG dedicated RACH occasion that is less than a quantity of preambles per legacy RACH occasion. Additionally, or alternatively, the RACH parameter may indicate a quantity of ATG dedicated RACH occasions allocated in a frequency domain that is greater than a quantity of legacy RACH occasions allocated in the frequency domain.

As shown by reference number 615, the ATG UE 305 may transmit a random access message (RAM) to the ATG base station 310. For example, the RAM may comprise a RACH preamble that is based at least in part on the ATG dedicated RACH configuration. For example, the ATG UE 305 may transmit a RACH preamble based at least in part on one or more of the parameters discussed above in connection with reference number 610.

In some aspects, the ATG UE 305 may transmit the RAM based at least in part on a threshold for SSB reception, such as an RSRP threshold for SSB reception. For example, the ATG dedicated RACH configuration may indicate a threshold for ATG UEs and/or a threshold for non-ATG UEs. The threshold for ATG UEs may be lower than the threshold for SSB reception associated with a legacy RACH configuration (e.g., for non-ATG UEs), such that ATG UEs are more easily triggered to transmit RAMs. For example, a lower RSRP threshold for RAM transmission may mean that RAM transmission is triggered more easily. Thus, by lowering the threshold for SSB reception for ATG UEs relative to non-ATG UEs, the rate of occurrence of RAM transmission by non-ATG UEs may be decreased, thereby reducing the occurrence of RACH resource starvation for ATG UEs and reducing interference due to RACH transmission by non-ATG UEs. In some aspects, for example, the RSRP threshold for SSB reception associated with a legacy RACH configuration may be configured as infinity.

As indicated above, FIG. 6 is provided as an example. Other examples may differ from what is described with regard to FIG. 6.

Figure 7:
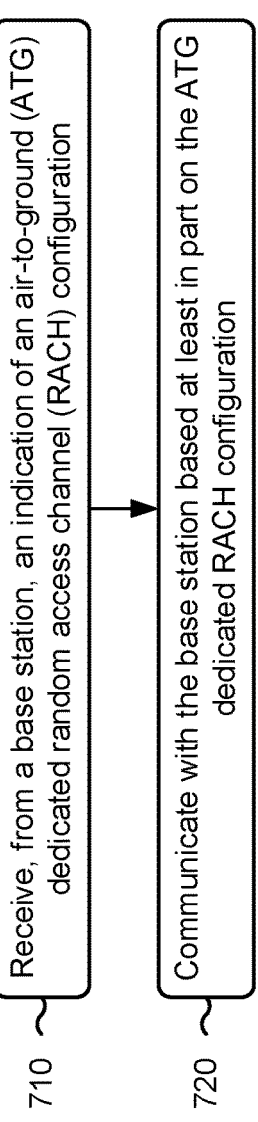

FIG. 7 is a diagram illustrating an example process 700 performed, for example, by a user equipment (UE), in accordance with the present disclosure. Example process 700 is an example where the UE (e.g., ATG UE 305) performs operations associated with ATG dedicated RACH configuration design for wireless ATG communications.

As shown in FIG. 7, in some aspects, process 700 may include receiving, from a base station, an indication of an ATG dedicated RACH configuration (block 710). For example, the UE (e.g., using communication manager 140 and/or reception component 1002, depicted in FIG. 10) may receive, from a base station, an indication of an ATG dedicated RACH configuration, as described above.

As further shown in FIG. 7, in some aspects, process 700 may include communicating with the base station based at least in part on the ATG dedicated RACH configuration (block 720). For example, the UE (e.g., using communication manager 140, reception component 1002, and/or transmission component 1004, depicted in FIG. 10) may communicate with the base station based at least in part on the ATG dedicated RACH configuration, as described above.

Process 700 may include additional aspects, such as any single aspect or any combination of aspects described below and/or in connection with one or more other processes described elsewhere herein.

In a first aspect, receiving the indication of the ATG dedicated RACH configuration comprises receiving the indication of the ATG dedicated RACH configuration based at least in part on an identification of a type of the UE.

In a second aspect, alone or in combination with the first aspect, the type of the UE is an aircraft type.

In a third aspect, alone or in combination with one or more of the first and second aspects, process 700 includes determining that the base station is a New Radio-ATG specific base station, wherein receiving the indication of the ATG dedicated RACH configuration comprises receiving the indication of the ATG dedicated RACH configuration based at least in part on determining that the base station is a New Radio-ATG specific base station.

In a fourth aspect, alone or in combination with the third aspect, determining that the base station is a New Radio-ATG specific base station comprises receiving system information that indicates that the base station is a New Radio-ATG specific base station.

In a fifth aspect, alone or in combination with the fourth aspect, receiving the system information comprises receiving at least one of a master information block or a system information block.

In a sixth aspect, alone or in combination with one or more of the first through fifth aspects, receiving the indication of the ATG dedicated RACH configuration comprises receiving one or more ATG dedicated RACH configuration parameters, the one or more ATG dedicated RACH configuration parameters comprising at least one of an ATG dedicated RACH common configuration parameter, or an ATG dedicated RACH generic configuration parameter.

In a seventh aspect, alone or in combination with the sixth aspect, the one or more ATG dedicated RACH configuration parameters indicate one or more ATG dedicated RACH occasions.

In an eighth aspect, alone or in combination with one or more of the first through seventh aspects, the ATG dedicated RACH configuration indicates a density of ATG dedicated RACH occasions within a set of resources that is greater than a density of legacy RACH occasions within the set of resources.

In a ninth aspect, alone or in combination with one or more of the first through eighth aspects, the ATG dedicated RACH configuration indicates a quantity of SSBs per ATG dedicated RACH occasion that is less than a quantity of SSBs per legacy RACH occasion.

In a tenth aspect, alone or in combination with one or more of the first through ninth aspects, the ATG dedicated RACH configuration indicates a quantity of preambles per ATG dedicated RACH occasion that is less than a quantity of preambles per legacy RACH occasion.

In an eleventh aspect, alone or in combination with one or more of the first through tenth aspects, the ATG dedicated RACH configuration indicates a quantity of ATG dedicated RACH occasions allocated in a frequency domain that is greater than a quantity of legacy RACH occasions allocated in the frequency domain.

In a twelfth aspect, alone or in combination with one or more of the first through eleventh aspects, communicating with the base station comprises transmitting a RACH preamble based at least in part on the ATG dedicated RACH configuration.

In a thirteenth aspect, alone or in combination with one or more of the first through twelfth aspects, an RSRP threshold for SSB reception associated with the ATG dedicated RACH configuration is less than an RSRP threshold for SSB reception associated with a legacy RACH configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by an UE, in accordance with the present disclosure. Example process 800 is an example where the UE (e.g., UE 120) performs operations associated with ATG dedicated RACH configuration design for wireless ATG communications.

As shown in FIG. 8, in some aspects, process 800 may include receiving an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources (block 810). For example, the UE (e.g., using communication manager 140 and/or reception component 1002, depicted in FIG. 10) may receive an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources, as described above.

As further shown in FIG. 8, in some aspects, process 800 may include communicating based at least in part on the legacy RACH configuration (block 820). For example, the UE (e.g., using communication manager 140, reception component 1002, and/or transmission component 1004, depicted in FIG. 10) may communicate based at least in part on the legacy RACH configuration, as described above.

Process 800 may include additional aspects, such as any single aspect or any combination of aspects described below and/or in connection with one or more other processes described elsewhere herein.

In a first aspect, receiving the indication of the legacy RACH configuration comprises receiving the indication of the legacy RACH configuration based at least in part on an identification of a type of the UE.

In a second aspect, alone or in combination with the first aspect, the type of the UE is not an aircraft type.

In a third aspect, alone or in combination with one or more of the first and second aspects, the legacy RACH configuration indicates a quantity of SSBs per legacy RACH occasion that is greater than a quantity of SSBs per ATG dedicated RACH occasion.

In a fourth aspect, alone or in combination with one or more of the first through third aspects, the legacy RACH configuration indicates a quantity of preambles per legacy RACH occasion that is greater than a quantity of preambles per ATG dedicated RACH occasion.

In a fifth aspect, alone or in combination with one or more of the first through fourth aspects, the legacy RACH configuration indicates a quantity of legacy RACH occasions allocated in a frequency domain that is less than a quantity of ATG dedicated RACH occasions allocated in the frequency domain.

In a sixth aspect, alone or in combination with one or more of the first through fifth aspects, communicating comprises transmitting a RACH preamble based at least in part on the legacy RACH configuration.

In a seventh aspect, alone or in combination with one or more of the first through sixth aspects, an RSRP threshold for SSB reception associated with the legacy RACH configuration is less than an RSRP threshold for SSB reception associated with the ATG dedicated RACH configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
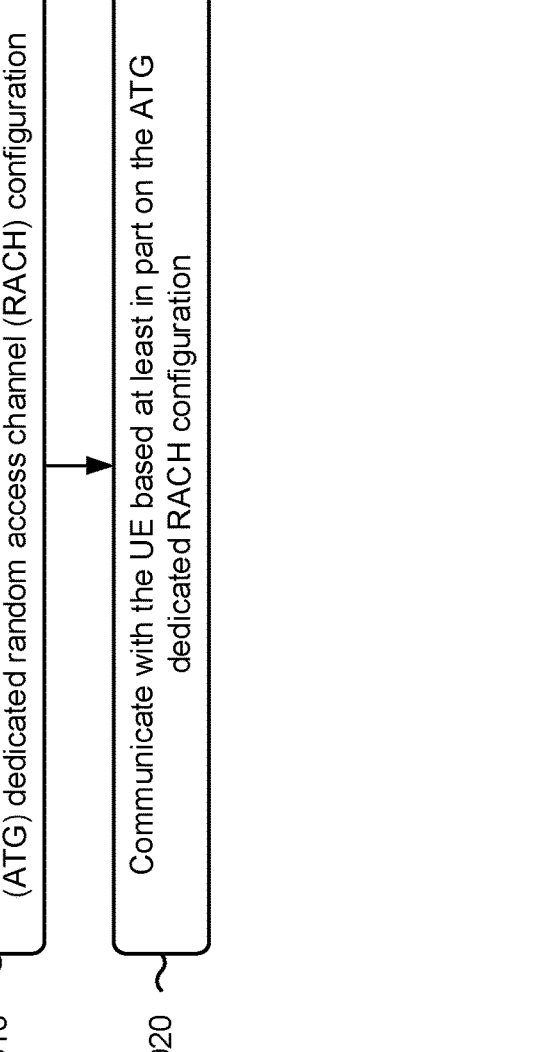

FIG. 9 is a diagram illustrating an example process 900 performed, for example, by a base station, in accordance with the present disclosure. Example process 900 is an example where the base station (e.g., ATG base station 310) performs operations associated with ATG dedicated RACH configuration design for wireless ATG communications.

As shown in FIG. 9, in some aspects, process 900 may include transmitting, to a UE, an indication of an ATG dedicated RACH configuration (block 910). For example, the base station (e.g., using communication manager 150 and/or transmission component 1104, depicted in FIG. 11) may transmit, to a UE, an indication of an ATG dedicated RACH configuration, as described above.

As further shown in FIG. 9, in some aspects, process 900 may include communicating with the UE based at least in part on the ATG dedicated RACH configuration (block 920). For example, the base station (e.g., using communication manager 150, reception component 1102, and/or transmission component 1104, depicted in FIG. 11) may communicate with the UE based at least in part on the ATG dedicated RACH configuration, as described above.

Process 900 may include additional aspects, such as any single aspect or any combination of aspects described below and/or in connection with one or more other processes described elsewhere herein.

In a first aspect, transmitting the indication of the ATG dedicated RACH configuration comprises transmitting the indication of the ATG dedicated RACH configuration based at least in part on an identification of a type of the UE.

In a second aspect, alone or in combination with the first aspect, the type of the UE is an aircraft type.

In a third aspect, alone or in combination with one or more of the first and second aspects, process 900 includes determining that the base station is a New Radio-ATG specific base station, wherein transmitting the indication of the ATG dedicated RACH configuration comprises transmitting the indication of the ATG dedicated RACH configuration based at least in part on determining that the base station is a New Radio-ATG specific base station.

In a fourth aspect, alone or in combination with one or more of the first through third aspects, transmitting the indication of the ATG dedicated RACH configuration comprises transmitting one or more ATG dedicated RACH configuration parameters, the one or more ATG dedicated RACH configuration parameters comprising at least one of an ATG dedicated RACH common configuration parameter, or an ATG dedicated RACH generic configuration parameter.

In a fifth aspect, alone or in combination with the fourth aspect, the one or more ATG dedicated RACH configuration parameters indicate one or more ATG dedicated RACH occasions.

In a sixth aspect, alone or in combination with one or more of the first through fifth aspects, the ATG dedicated RACH configuration indicates a density of ATG dedicated RACH occasions within a set of resources that is greater than a density of legacy RACH occasions within the set of resources.

In a seventh aspect, alone or in combination with one or more of the first through sixth aspects, the ATG dedicated RACH configuration indicates a quantity of SSBs per ATG dedicated RACH occasion that is less than a quantity of SSBs per legacy RACH occasion.

In an eighth aspect, alone or in combination with one or more of the first through seventh aspects, the ATG dedicated RACH configuration indicates a quantity of preambles per ATG dedicated RACH occasion that is less than a quantity of preambles per legacy RACH occasion.

In a ninth aspect, alone or in combination with one or more of the first through eighth aspects, the ATG dedicated RACH configuration indicates a quantity of ATG dedicated RACH occasions allocated in a frequency domain that is greater than a quantity of legacy RACH occasions allocated in the frequency domain.

In a tenth aspect, alone or in combination with one or more of the first through ninth aspects, communicating with the UE comprises receiving a RACH preamble based at least in part on the ATG dedicated RACH configuration.

In an eleventh aspect, alone or in combination with one or more of the first through tenth aspects, an RSRP threshold for SSB reception associated with the ATG dedicated RACH configuration is less than an RSRP threshold for SSB reception associated with a legacy RACH configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
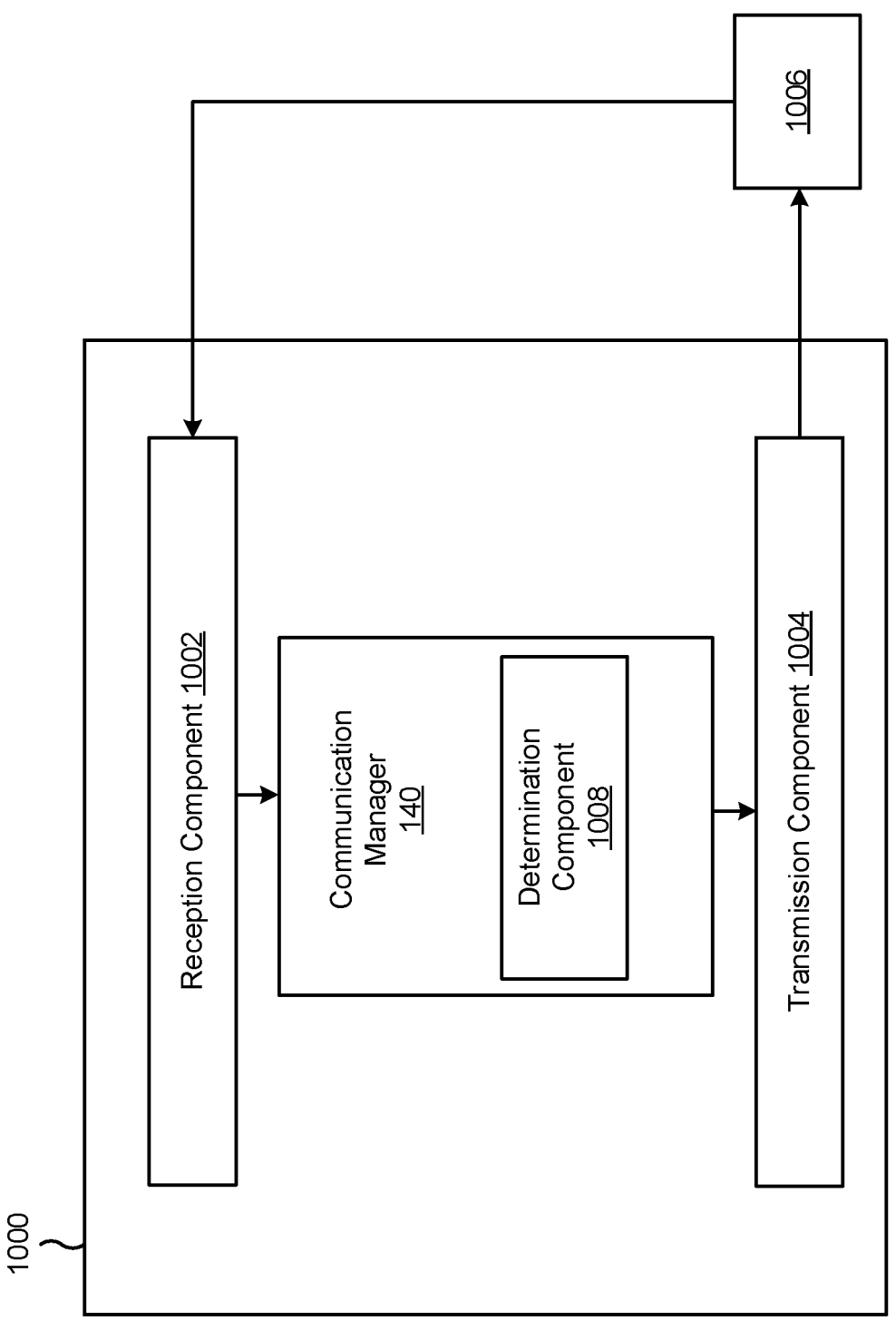
FIGS. 10 and 11 are block diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a determination component 1008.

In some aspects, the apparatus 1000 may be configured to perform one or more operations described herein in connection with FIG. 6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2.

Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a base station, an indication of an ATG dedicated RACH configuration. The reception component 1002 and/or the transmission component 1004 may communicate with the base station based at least in part on the ATG dedicated RACH configuration.

The determination component 1008 may determine that the base station is a New Radio-ATG specific base station, wherein receiving the indication of the ATG dedicated RACH configuration comprises receiving the indication of the ATG dedicated RACH configuration based at least in part on determining that the base station is a New Radio-ATG specific base station. In some aspects, the communication manager 140 and/or the determination component 1008 may include one or more antennas, a modem, a modulator, a transmit MIMO processor, a transmit processor, a controller/processor, a memory, or a combination thereof, of the UE described in connection with FIG. 2. In some aspects, the communication manager 140 and/or the determination component 1008 may include the reception component 1002 and/or the transmission component 1004.

The reception component 1002 may receive an indication of a legacy RACH configuration associated with a set of resources, wherein the legacy RACH configuration indicates one or more legacy RACH parameters that are different than one or more ATG dedicated RACH parameters corresponding to an ATG dedicated RACH configuration associated with the set of resources. The reception component 1002 and/or the transmission component 1004 may communicate based at least in part on the legacy RACH configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
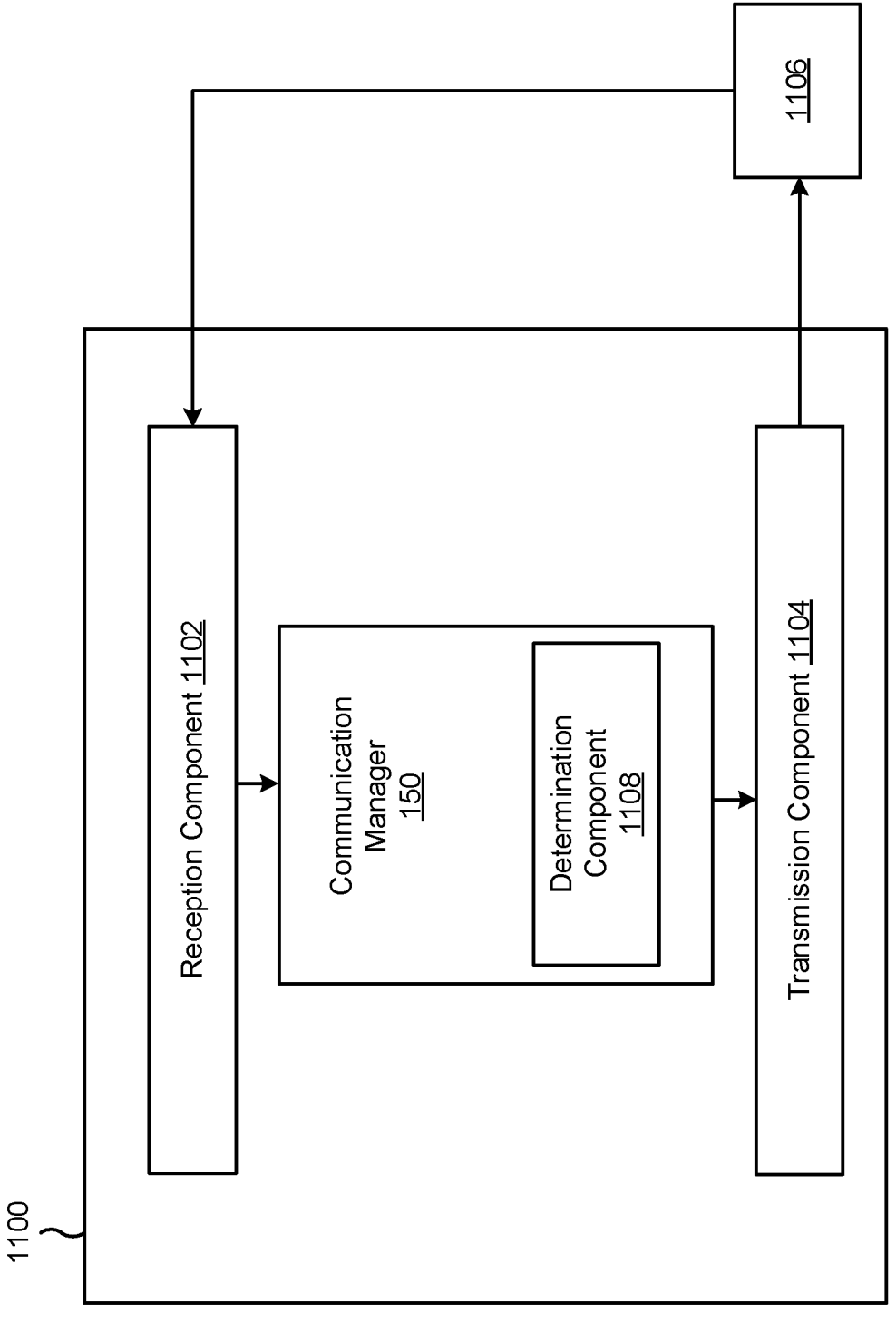

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108.

In some aspects, the apparatus 1100 may be configured to perform one or more operations described herein in connection with FIG. 6. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, an indication of an ATG dedicated RACH configuration. The reception component 1102 and/or the transmission component 1104 may communicate with the UE based at least in part on the ATG dedicated RACH configuration.

The determination component 1108 may determine that the base station is a New Radio-ATG specific base station, wherein transmitting the indication of the ATG dedicated RACH configuration comprises transmitting the indication of the ATG dedicated RACH configuration based at least in part on determining that the base station is a New Radio-ATG specific base station. In some aspects, the communication manager 150 and/or the determination component 1108 may include one or more antennas, a modem, a modulator, a transmit MIMO processor, a transmit processor, a controller/processor, a memory, or a combination thereof, of the base station described in connection with FIG. 2. In some aspects, the communication manager 150 and/or the determination component 1108 may include the reception component 1102 and/or the transmission component 1104.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, an indication of an air-to-ground (ATG) dedicated random access channel (RACH) configuration; and communicating with the base station based at least in part on the ATG dedicated RACH configuration.

Aspect 2: The method of Aspect 1, wherein receiving the indication of the ATG dedicated RACH configuration comprises receiving the indication of the ATG dedicated RACH configuration based at least in part on an identification of a type of the UE.

Aspect 3: The method of Aspect 2, wherein the type of the UE is an aircraft type.

Aspect 4: The method of any of Aspects 1-3, further comprising determining that the base station is a New Radio-ATG specific base station, wherein receiving the indication of the ATG dedicated RACH configuration comprises receiving the indication of the ATG dedicated RACH configuration based at least in part on determining that the base station is a New Radio-ATG specific base station.

Aspect 5: The method of Aspect 4, wherein determining that the base station is a New Radio-ATG specific base station comprises receiving system information that indicates that the base station is a New Radio-ATG specific base station.

Aspect 6: The method of Aspect 5, wherein receiving the system information comprises receiving at least one of a master information block or a system information block.

Aspect 7: The method of any of Aspects 1-6, wherein receiving the indication of the ATG dedicated RACH configuration comprises receiving one or more ATG dedicated RACH configuration parameters, the one or more ATG dedicated RACH configuration parameters comprising at least one of: an ATG dedicated RACH common configuration parameter, or an ATG dedicated RACH generic configuration parameter.

Aspect 8: The method of Aspect 7, wherein the one or more ATG dedicated RACH configuration parameters indicate one or more ATG dedicated RACH occasions.

Aspect 9: The method of any of Aspects 1-8, wherein the ATG dedicated RACH configuration indicates a density of ATG dedicated RACH occasions within a set of resources that is greater than a density of legacy RACH occasions within the set of resources.

Aspect 10: The method of any of Aspects 1-9, wherein the ATG dedicated RACH configuration indicates a quantity of synchronization signal blocks (SSBs) per ATG dedicated RACH occasion that is less than a quantity of SSBs per legacy RACH occasion.

Aspect 11: The method of any of Aspects 1-10, wherein the ATG dedicated RACH configuration indicates a quantity of preambles per ATG dedicated RACH occasion that is less than a quantity of preambles per legacy RACH occasion.

Aspect 12: The method of any of Aspects 1-11, wherein the ATG dedicated RACH configuration indicates a quantity of ATG dedicated RACH occasions allocated in a frequency domain that is greater than a quantity of legacy RACH occasions allocated in the frequency domain.

Aspect 13: The method of any of Aspects 1-12, wherein communicating with the base station comprises transmitting a RACH preamble based at least in part on the ATG dedicated RACH configuration.

Aspect 14: The method of any of Aspects 1-13, wherein a reference signal received power (RSRP) threshold for synchronization signal block (SSB) reception associated with the ATG dedicated RACH configuration is less than an RSRP threshold for SSB reception associated with a legacy RACH configuration.

Aspect 15: A method of wireless communication performed by a user equipment (UE), comprising: receiving an indication of a legacy random access channel (RACH) configuration associated with a set of resources, wherein the legacy RACH configuration indicates one or more legacy RACH parameters that are different than one or more air-to-ground (ATG) dedicated RACH parameters corresponding to an ATG dedicated RACH configuration associated with the set of resources; and communicating based at least in part on the legacy RACH configuration.

Aspect 16: The method of Aspect 15, wherein receiving the indication of the legacy RACH configuration comprises receiving the indication of the legacy RACH configuration based at least in part on an identification of a type of the UE.

Aspect 17: The method of Aspect 16, wherein the type of the UE is not an aircraft type.

Aspect 18: The method of any of Aspects 15-17, wherein the legacy RACH configuration indicates a quantity of synchronization signal blocks (SSBs) per legacy RACH occasion that is greater than a quantity of SSBs per ATG dedicated RACH occasion.

Aspect 19: The method of any of Aspects 15-18, wherein the legacy RACH configuration indicates a quantity of preambles per legacy RACH occasion that is greater than a quantity of preambles per ATG dedicated RACH occasion.

Aspect 20: The method of any of Aspects 15-19, wherein the legacy RACH configuration indicates a quantity of legacy RACH occasions allocated in a frequency domain that is less than a quantity of ATG dedicated RACH occasions allocated in the frequency domain.

Aspect 21: The method of any of Aspects 15-20, wherein communicating comprises transmitting a RACH preamble based at least in part on the legacy RACH configuration.

Aspect 22: The method of any of Aspects 15-21, wherein a reference signal received power (RSRP) threshold for synchronization signal block (SSB) reception associated with the legacy RACH configuration is less than an RSRP threshold for SSB reception associated with the ATG dedicated RACH configuration.

Aspect 23: A method of wireless communication performed by a base station, comprising: transmitting, to a user equipment (UE), an indication of an air-to-ground (ATG) dedicated random access channel (RACH) configuration; and communicating with the UE based at least in part on the ATG dedicated RACH configuration.

Aspect 24: The method of Aspect 23, wherein transmitting the indication of the ATG dedicated RACH configuration comprises transmitting the indication of the ATG dedicated RACH configuration based at least in part on an identification of a type of the UE.

Aspect 25: The method of Aspect 24, wherein the type of the UE is an aircraft type.

Aspect 26: The method of any of Aspects 23-25, further comprising determining that the base station is a New Radio-ATG specific base station, wherein transmitting the indication of the ATG dedicated RACH configuration comprises transmitting the indication of the ATG dedicated RACH configuration based at least in part on determining that the base station is a New Radio-ATG specific base station.

Aspect 27: The method of any of Aspects 23-26, wherein transmitting the indication of the ATG dedicated RACH configuration comprises transmitting one or more ATG dedicated RACH configuration parameters, the one or more ATG dedicated RACH configuration parameters comprising at least one of: an ATG dedicated RACH common configuration parameter, or an ATG dedicated RACH generic configuration parameter.

Aspect 28: The method of Aspect 27, wherein the one or more ATG dedicated RACH configuration parameters indicate one or more ATG dedicated RACH occasions.

Aspect 29: The method of any of Aspects 23-28, wherein the ATG dedicated RACH configuration indicates a density of ATG dedicated RACH occasions within a set of resources that is greater than a density of legacy RACH occasions within the set of resources.

Aspect 30: The method of any of Aspects 23-29, wherein the ATG dedicated RACH configuration indicates a quantity of synchronization signal blocks (SSBs) per ATG dedicated RACH occasion that is less than a quantity of SSBs per legacy RACH occasion.

Aspect 31: The method of any of Aspects 23-30, wherein the ATG dedicated RACH configuration indicates a quantity of preambles per ATG dedicated RACH occasion that is less than a quantity of preambles per legacy RACH occasion.

Aspect 32: The method of any of Aspects 23-31, wherein the ATG dedicated RACH configuration indicates a quantity of ATG dedicated RACH occasions allocated in a frequency domain that is greater than a quantity of legacy RACH occasions allocated in the frequency domain.

Aspect 33: The method of any of Aspects 23-32, wherein communicating with the UE comprises receiving a RACH preamble based at least in part on the ATG dedicated RACH configuration.

Aspect 34: The method of any of Aspects 23-33, wherein a reference signal received power (RSRP) threshold for synchronization signal block (SSB) reception associated with the ATG dedicated RACH configuration is less than an RSRP threshold for SSB reception associated with a legacy RACH configuration.

Aspect 35: An apparatus for wireless communication at a device, comprising a processor; memory coupled with the processor; and instructions stored in the memory and executable by the processor to cause the apparatus to perform the method of one or more of Aspects 1-14.

Aspect 36: A device for wireless communication, comprising a memory and one or more processors coupled to the memory, the one or more processors configured to perform the method of one or more of Aspects 1-14.

Aspect 37: An apparatus for wireless communication, comprising at least one means for performing the method of one or more of Aspects 1-14.

Aspect 38: A non-transitory computer-readable medium storing code for wireless communication, the code comprising instructions executable by a processor to perform the method of one or more of Aspects 1-14.

Aspect 39: A non-transitory computer-readable medium storing a set of instructions for wireless communication, the set of instructions comprising one or more instructions that, when executed by one or more processors of a device, cause the device to perform the method of one or more of Aspects 1-14.

Aspect 40: An apparatus for wireless communication at a device, comprising a processor; memory coupled with the processor; and instructions stored in the memory and executable by the processor to cause the apparatus to perform the method of one or more of Aspects 15-22.

Aspect 41: A device for wireless communication, comprising a memory and one or more processors coupled to the memory, the one or more processors configured to perform the method of one or more of Aspects 15-22.

Aspect 42: An apparatus for wireless communication, comprising at least one means for performing the method of one or more of Aspects 15-22.

Aspect 43: A non-transitory computer-readable medium storing code for wireless communication, the code comprising instructions executable by a processor to perform the method of one or more of Aspects 15-22.

Aspect 44: A non-transitory computer-readable medium storing a set of instructions for wireless communication, the set of instructions comprising one or more instructions that, when executed by one or more processors of a device, cause the device to perform the method of one or more of Aspects 15-22.

Aspect 45: An apparatus for wireless communication at a device, comprising a processor; memory coupled with the processor; and instructions stored in the memory and executable by the processor to cause the apparatus to perform the method of one or more of Aspects 23-34.

Aspect 46: A device for wireless communication, comprising a memory and one or more processors coupled to the memory, the one or more processors configured to perform the method of one or more of Aspects 23-34.

Aspect 47: An apparatus for wireless communication, comprising at least one means for performing the method of one or more of Aspects 23-34.

Aspect 48: A non-transitory computer-readable medium storing code for wireless communication, the code comprising instructions executable by a processor to perform the method of one or more of Aspects 23-34.

Aspect 49: A non-transitory computer-readable medium storing a set of instructions for wireless communication, the set of instructions comprising one or more instructions that, when executed by one or more processors of a device, cause the device to perform the method of one or more of Aspects 23-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of:

a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
at least one transceiver;
at least one memory comprising instructions; and
one or more processors configured to execute the instructions to cause the UE to:
receive, from a base station via the at least one transceiver, an indication of an air-to-ground (ATG) dedicated random access channel (RACH) configuration, wherein:
the ATG dedicated RACH configuration indicates a density of ATG dedicated RACH occasions within a set of resources that is greater than a density of legacy RACH occasions within the set of resources,
the ATG dedicated RACH configuration indicates a quantity of synchronization signal blocks (SSBs) per ATG dedicated RACH occasion that is less than a quantity of SSBs per legacy RACH occasion,
the ATG dedicated RACH configuration indicates a quantity of preambles per ATG dedicated RACH occasion that is less than a quantity of preambles per legacy RACH occasion, or
the ATG dedicated RACH configuration indicates a quantity of ATG dedicated RACH occasions allocated in a frequency domain that is greater than a quantity of legacy RACH occasions allocated in the frequency domain; and
communicate, via the at least one transceiver, with the base station based at least in part on the ATG dedicated RACH configuration.

2. The UE of claim 1, wherein the one or more processors, to receive the indication of the ATG dedicated RACH configuration, are configured to cause the UE to receive the indication of the ATG dedicated RACH configuration based at least in part on an identification of a type of the UE.

3. The UE of claim 2, wherein the type of the UE is an aircraft type.

4. The UE of claim 1, wherein the one or more processors are further configured to cause the UE to determine that the base station is a New Radio-ATG specific base station, wherein the one or more processors, to receive the indication of the ATG dedicated RACH configuration, are configured to cause the UE to receive the indication of the ATG dedicated RACH configuration based at least in part on determining that the base station is a New Radio-ATG specific base station.

5. The UE of claim 4, wherein the one or more processors, to determine that the base station is a New Radio-ATG specific base station, are configured to cause the UE to receive, via the at least one transceiver, system information that indicates that the base station is a New Radio-ATG specific base station.

6. The UE of claim 5, wherein the one or more processors, to receive the system information, are configured to cause the UE to receive at least one of a master information block or a system information block.

7. The UE of claim 1, wherein the one or more processors, to receive the indication of the ATG dedicated RACH configuration, are configured to cause the UE to receive one or more ATG dedicated RACH configuration parameters, the one or more ATG dedicated RACH configuration parameters comprising at least one of:
an ATG dedicated RACH common configuration parameter, or
an ATG dedicated RACH generic configuration parameter.

8. The UE of claim 7, wherein the one or more ATG dedicated RACH configuration parameters indicate one or more ATG dedicated RACH occasions.

9. The UE of claim 1, wherein the one or more processors, to communicate with the base station, are configured cause the UE to transmit a RACH preamble based at least in part on the ATG dedicated RACH configuration.

10. The UE of claim 1, wherein a reference signal received power (RSRP) threshold for synchronization signal block (SSB) reception associated with the ATG dedicated RACH configuration is less than an RSRP threshold for SSB reception associated with a legacy RACH configuration.

11. A user equipment (UE), comprising:
at least one transceiver;
at least one memory comprising instructions; and
one or more processors configured to execute the instructions to cause the UE to:
receive, via the at least one transceiver, an indication of a legacy random access channel (RACH) configuration associated with a set of resources, wherein the legacy RACH configuration indicates one or more legacy RACH parameters that are different than one or more air-to-ground (ATG) dedicated RACH parameters corresponding to an ATG dedicated RACH configuration associated with the set of resources; and
communicate, via the at least one transceiver, based at least in part on the legacy RACH configuration.

12. The UE of claim 11, wherein the one or more processors, to receive the indication of the legacy RACH configuration, are configured to cause the UE to receive the indication of the legacy RACH configuration based at least in part on an identification of a type of the UE.

13. The UE of claim 12, wherein the type of the UE is not an aircraft type.

14. The UE of claim 11, wherein the legacy RACH configuration indicates a quantity of synchronization signal blocks (SSBs) per legacy RACH occasion that is greater than a quantity of SSBs per ATG dedicated RACH occasion.

15. The UE of claim 11, wherein the legacy RACH configuration indicates a quantity of preambles per legacy RACH occasion that is greater than a quantity of preambles per ATG dedicated RACH occasion.

16. The UE of claim 11, wherein the legacy RACH configuration indicates a quantity of legacy RACH occasions allocated in a frequency domain that is less than a quantity of ATG dedicated RACH occasions allocated in the frequency domain.

17. The UE of claim 11, wherein the one or more processors, to communicate, are configured to cause the UE to transmit a RACH preamble based at least in part on the legacy RACH configuration.

18. The UE of claim 11, wherein a reference signal received power (RSRP) threshold for synchronization signal block (SSB) reception associated with the legacy RACH configuration is less than an RSRP threshold for SSB reception associated with the ATG dedicated RACH configuration.

19. A base station, comprising:
at least one transceiver;
at least one memory comprising instructions; and
one or more processors configured to execute the instructions to cause the base station to:
transmit, to a user equipment (UE) via the at least one transceiver, an indication of an air-to-ground (ATG) dedicated random access channel (RACH) configuration, wherein:
the ATG dedicated RACH configuration indicates a density of ATG dedicated RACH occasions within a set of resources that is greater than a density of legacy RACH occasions within the set of resources,
the ATG dedicated RACH configuration indicates a quantity of synchronization signal blocks (SSBs) per ATG dedicated RACH occasion that is less than a quantity of SSBs per legacy RACH occasion,
the ATG dedicated RACH configuration indicates a quantity of preambles per ATG dedicated RACH occasion that is less than a quantity of preambles per legacy RACH occasion, or
the ATG dedicated RACH configuration indicates a quantity of ATG dedicated RACH occasions allocated in a frequency domain that is greater than a quantity of legacy RACH occasions allocated in the frequency domain; and
communicate, via the at least one transceiver, with the UE based at least in part on the ATG dedicated RACH configuration.

20. The base station of claim 19, wherein the one or more processors, to transmit the indication of the ATG dedicated RACH configuration, are configured to cause the base station to transmit the indication of the ATG dedicated RACH configuration based at least in part on an identification of a type of the UE.

21. The base station of claim 20, wherein the type of the UE is an aircraft type.

22. The base station of claim 19, wherein the one or more processors are further configured to cause the base station to determine that the base station is a New Radio-ATG specific base station, wherein the one or more processors, to transmit the indication of the ATG dedicated RACH configuration, are configured to transmit the indication of the ATG dedicated RACH configuration based at least in part on determining that the base station is a New Radio-ATG specific base station.

23. The base station of claim 19, wherein the one or more processors, to transmit the indication of the ATG dedicated RACH configuration, are configured to cause the base station to transmit one or more ATG dedicated RACH configuration parameters, the one or more ATG dedicated RACH configuration parameters comprising at least one of:
an ATG dedicated RACH common configuration parameter, or an ATG dedicated RACH generic configuration parameter.

24. The base station of claim 23, wherein the one or more ATG dedicated RACH configuration parameters indicate one or more ATG dedicated RACH occasions.

25. A user equipment (UE), comprising:
at least one transceiver;
at least one memory comprising instructions; and
one or more processors configured to execute the instructions to cause the UE to:
receive, from a base station via the at least one transceiver, an indication of an air-to-ground (ATG) dedicated random access channel (RACH) configuration, wherein a reference signal received power (RSRP) threshold for synchronization signal block (SSB) reception associated with the ATG dedicated RACH configuration is less than an RSRP threshold for SSB reception associated with a legacy RACH configuration; and
communicate, via the at least one transceiver, with the base station based at least in part on the ATG dedicated RACH configuration.

* * * * *